United States Patent
Chua et al.

(12) 
(10) Patent No.: US 7,462,815 B2
(45) Date of Patent: Dec. 9, 2008

(54) ABSOLUTE ENCODER UTILIZING A CODE PATTERN CARRIER HAVING A VARYING MIXTURE OF PHOSPHORS DEPOSITED THEREON

(75) Inventors: Janet Bee Yin Chua, Jalan Bruas (MY); Yee Loong Chin, Taman Pinji Mewah (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 64 days.

(21) Appl. No.: 11/301,600

(22) Filed: Dec. 13, 2005

(65) Prior Publication Data
US 2007/0131853 A1  Jun. 14, 2007

(51) Int. Cl.
G01D 5/34 (2006.01)
G01D 5/36 (2006.01)
G01B 3/56 (2006.01)
H03M 1/22 (2006.01)

(52) U.S. Cl. .............................. 250/231.13; 250/237 G; 33/1 N; 341/11

(58) Field of Classification Search ................................. 250/231.13–231.18, 237 R, 237 G, 225; 33/1 PT, 1 N; 356/616, 617; 341/11, 13, 341/31; 345/166, 163; 359/2, 634
See application file for complete search history.

(56) References Cited

U.S. PATENT DOCUMENTS

| | | | | |
|---|---|---|---|---|
| 5,886,354 A * | 3/1999 | Leblans | .................... | 250/484.4 |
| 6,437,318 B1 * | 8/2002 | Egloff et al. | ................. | 250/225 |
| 6,822,219 B1 * | 11/2004 | Braun | .................... | 250/231.13 |
| 6,927,388 B2 * | 8/2005 | Imai et al. | ............... | 250/231.13 |
| 7,112,781 B2 * | 9/2006 | Ch'ng et al. | ............ | 250/231.13 |
| 7,265,338 B2 * | 9/2007 | Kiriyama et al. | ........ | 250/231.13 |
| 2004/0061044 A1 * | 4/2004 | Soar | ...................... | 250/231.13 |
| 2004/0263923 A1 * | 12/2004 | Moon et al. | ..................... | 359/2 |

* cited by examiner

Primary Examiner—Georgia Y Epps
Assistant Examiner—Don Williams

(57) ABSTRACT

An encoder having a code carrier, light source, and detector is disclosed. The code carrier includes a track that emits light at each of a plurality of track points on the track when that track point is illuminated with light having a predetermined spectrum. Each of the track points emits light having a spectrum that is different from the spectrum emitted by others of the track points. The light source illuminates a portion of the track with light of the predetermined illumination spectrum. The detector provides a plurality of signals indicative of the spectrum of light leaving the portion of the track when the portion includes one of the track points. The code carrier moves with respect to the detector, and the signals define the relative position of the code carrier with respect to the detector.

16 Claims, 5 Drawing Sheets

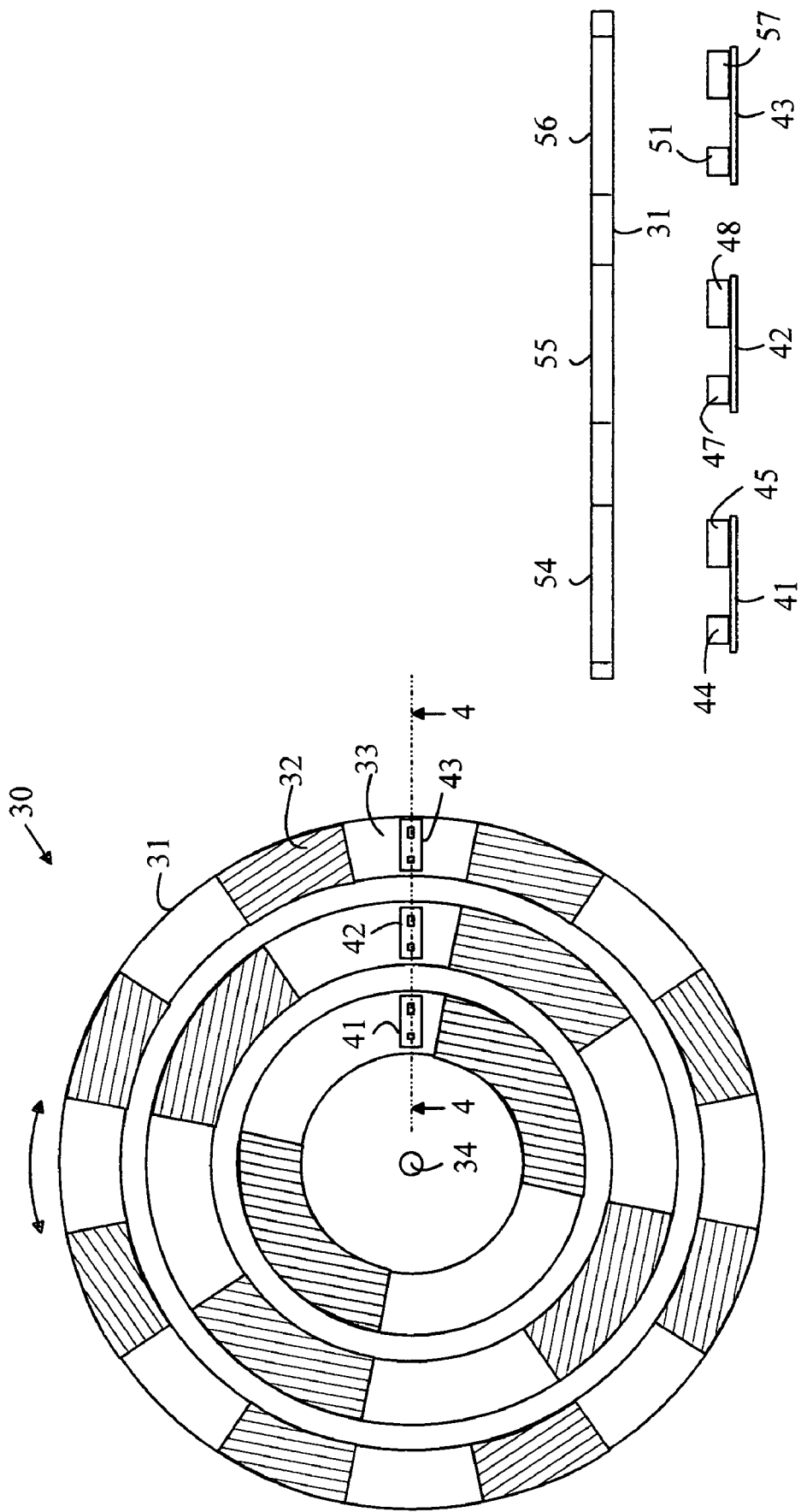

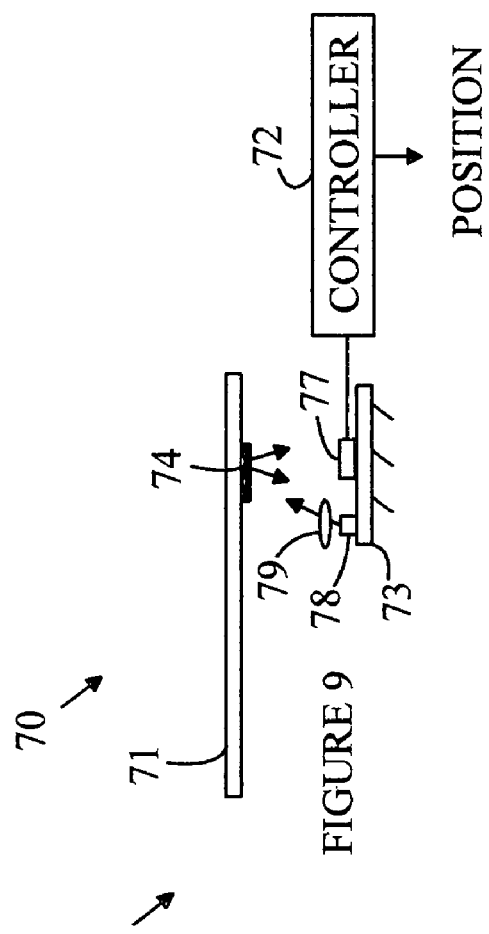
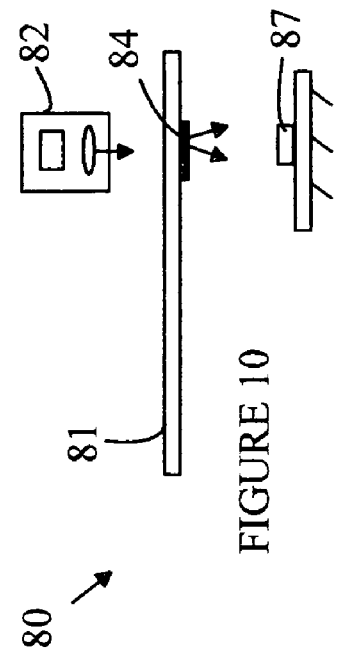
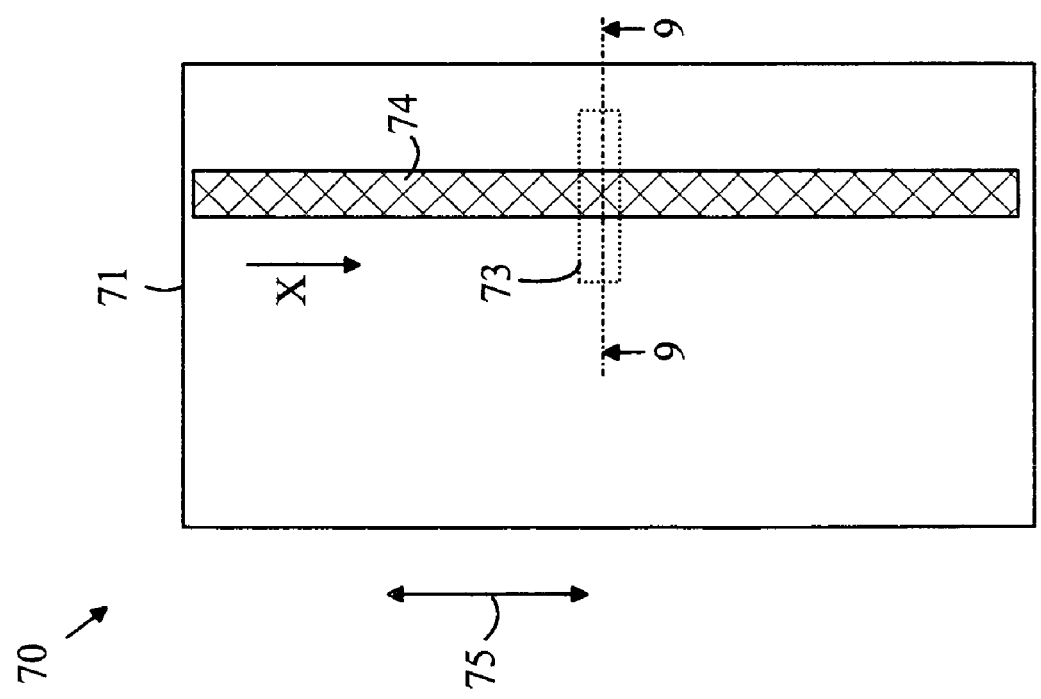

ABSOLUTE ENCODER UTILIZING A CODE PATTERN CARRIER HAVING A VARYING MIXTURE OF PHOSPHORS DEPOSITED THEREON

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

To measure the position of a first component that moves with reference to a second component, an encoder typically uses one or more tracks on a carrier in which each track consists of a series of alternating dark and light bands that are viewed by a detector that outputs a digital value depending on whether the band currently being viewed is light or dark. The track is affixed to one of the components and the detector is affixed to the other.

Encoders can be divided into two broad classes. An incremental encoder typically utilizes a single track that is viewed by a detector that determines the direction and the number of bands that have passed the detector since a reference mark was detected. The position is determined by incrementing and decrementing a counter as each band passes the detector. The counter is reset when a reference mark is detected.

An absolute shaft encoder typically utilizes a plurality of tracks. The code pattern on each track has bands of different widths from the code pattern on the other tracks. An N-bit binary encoder typically utilizes N such tracks, one per bit. In addition to requiring a much larger number of detectors and a more complex code pattern carrier, an absolute encoder requires that the detectors for the various tracks be aligned with respect to one another, which further increases the cost of such encoders relative to incremental encoders.

While incremental encoders are less expensive than absolute encoders, incremental encoders are subject to errors that are often unacceptable. For example, if the circuitry fails to count a transition from a light to dark band, the counter, and hence, the position measurement will be in error until the counter is reset the next time the reference point is detected. Absolute encoders, in contrast, can be in error for at most one band of the track having the finest resolution. Hence, absolute encoders are preferred in many applications in spite of the additional cost associated with such encoders.

As the size of the mechanical systems that utilize encoders decreases, the size of the encoders must also decrease. Decreasing the size of an absolute encoder presents a number of challenges. One factor that limits the minimum size of an absolute encoder is cross-talk between the detectors used on the various tracks. Each track in the encoder is illuminated with a light source. The light from the illuminated track is imaged onto a corresponding photodetector that determines whether the band currently being viewed is light or dark. The light that strikes the detector consists of light that is reflected from the code bands of the track corresponding to that detector as well as light from an adjacent track that is scattered into the detector due to imperfections in the optical system and code carriers. This scattered light forms a background that reduces the signal-to-noise ratio of the detector, and hence, can lead to errors in the measured position. As the code bands are reduced in size in an effort to reduce the size of the encoder, the light available from a track decreases, since the size of the bands must be reduced. In addition, the distance between the tracks decreases, which, in turn, reduces the buffer space between the tracks that protects each detector from scattered light from a neighboring track. Both of these factors lead to reduced signal-to-noise ratios.

The cross-talk problem is particularly acute in reflective encoders. In a reflective encoder, each track consists of a series of reflective and absorptive bands. Light is reflected from the reflective bands into the detector associated with the track. While the absorptive bands can be made nearly ideal by utilizing a hole in the code strip for the absorptive bands, the reflective bands are less than ideal. Ideally, the reflective bands are perfect mirrors. However, in practice, the mirrors have imperfections. In addition, debris accumulates on the surface over time. These factors result in a surface that scatters some portion of the light incident on the surface. Some of the scattered light falls on the detectors corresponding to the adjacent tracks.

Finally, as the size of the encoder decreases, the problems associated with aligning the various detectors increases. Hence, the cost of assembly increases.

SUMMARY OF THE INVENTION

The present invention includes an encoder having a code carrier, light source, and detector. The code carrier includes a track that emits light at each of a plurality of track points on the track when that track point is illuminated with light having a predetermined spectrum. Each of the track points emits light having a spectrum that is different from the spectrum emitted by others of the track points. The light source illuminates a portion of the track with light of the predetermined illumination spectrum. The detector provides a plurality of signals indicative of the spectrum of light leaving the portion of the track when the portion includes one of the track points. The code carrier moves with respect to the detector, and the signals define the relative position of the code carrier with respect to the detector. Each track point includes a mixture of phosphors, the mixture having a different composition for each of the track points. The phosphors can be conventional phosphors or quantum dot phosphors. The mixture of phosphors can vary in composition in a continuous manner as a function of the distance along the track.

BRIEF DESCRIPTION OF THE DRAWINGS

FIG. 3 is a top view of a typical prior art absolute reflective shaft encoder.

FIG. 4 is a cross-sectional view of a shaft encoder through line 4-4 shown in FIG. 3.

FIG. 8 is a top view of a linear encoder according to one embodiment of the present invention.

FIG. 9 is a cross-sectional view of encoder 70 through line 9-9 shown in FIG. 8.

FIG. 10 is a cross-sectional view of another embodiment of an encoder according to the present invention.

DETAILED DESCRIPTION OF THE PREFERRED EMBODIMENTS OF THE INVENTION

Figure 2:
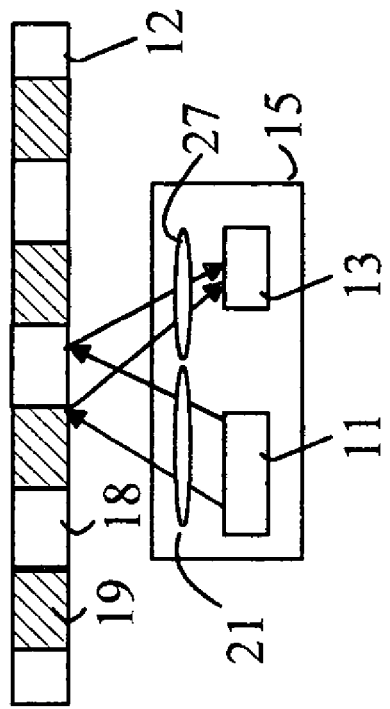
FIG. 2 illustrates one type of reflective encoder.
Figure 1:
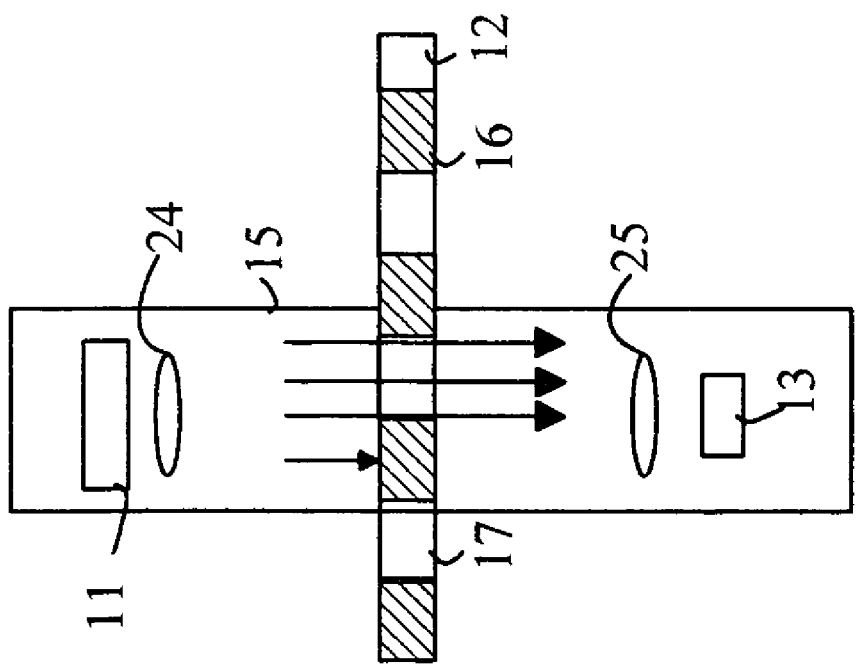
FIG. 1 illustrates a transmissive encoder.

The manner in which the present invention provides its advantages can be more easily understood with reference to FIGS. 1-4, which illustrate some typical prior art encoder designs. Referring to FIGS. 1 and 2, the encoder can be divided into an emitter/detector module 15 and a code wheel or code strip. Module 15 includes an emitter 11 that illuminates a portion of the code pattern carrier 12. A detector 13 views the illuminated code pattern carrier. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as lens 24. Code carrier 12 includes opaque bands 16 and transparent bands 17. When code carrier 12 moves between emitter 11 and detector 13, the light beam is interrupted by the opaque bands on the code carrier. The photodiodes in the detector receive flashes of light. The resultant signal is then used to generate a logic signal that transitions between logical one and logical zero.

The detector can include an imaging lens 25 that images the collimated light onto the photodiode. Lens 25 can be used to adjust the size of the light bands to match the size of the photodiode or photodiodes in the detector. When used in this manner, the photodetector is placed at a point between the code carrier and the focal point of lens 25. The distance between the photodetector and the lens determines the size of the code carrier image on the photodetector.

In general, the collimator is constructed from two separate sub-modules that are provided to the manufacturer of the encoder. The first sub-module includes the light source consisting of emitter 11 and lens 24. The second sub-module consists of photodetector 13 and lens 25. The code carrier consists of either absorptive bands or holes. Stray light directed toward a neighboring track's detector could be generated by light reflecting off of the side of the holes.

FIG. 2 illustrates one type of reflective encoder. In reflective encoders, the code carrier includes reflective bands 18 and absorptive bands 19. The light from the emitter is reflected or absorbed by the bands on the code carrier. The emitter includes an optical system such as a lens 21 that images the emitter light source into the detector when the light strikes a reflective band on the code carrier. The output from the photodetector is again converted to a logic signal. In embodiments in which the photodetector includes a plurality of photodiodes that provide a signal that depends on matching an image of the bands to the photodiodes, a second lens 27 can be included to adjust the size of the code carrier image to the size of the photodetectors in a manner analogous to that described above. This arrangement assumes that the reflective bands are perfect mirrors. As noted above, the mirrors that can be constructed at a reasonable cost are less than perfect, and hence, stray light that can reach neighboring detectors is generated.

Refer now to FIGS. 3 and 4, which illustrate a typical prior art absolute reflective shaft encoder. FIG. 3 is a top view of shaft encoder 30, and FIG. 4 is a cross-sectional view of shaft encoder 30 through line 4-4 shown in FIG. 3. Shaft encoder 30 includes a code wheel having a number of concentric tracks. To simplify the drawing only the three outer tracks 54-56 are shown in the drawing. Each track has alternating reflective and absorptive bands. Exemplary reflective and absorptive bands are shown at 32 and 33, respectively. Code wheel 31 rotates with a shaft 34 whose position is to be measured using the encoder.

Shaft encoder 30 includes one emitter-detector module for each track. The emitter-detector modules corresponding to tracks 54-56 are shown at 41-43, respectively. Each emitter-detector module includes a light source and a photodetector. To simplify the drawings, any lenses associated with the light source or photodetector have been omitted from the drawing; however, it is to be understood that light sources and photodetectors may include one or more lenses. The light sources corresponding to emitter-detector modules 41-43 are shown at 44, 47, and 51, respectively. The photodetectors corresponding to emitter-detector modules 41-43 are shown at 45, 48, and 57, respectively.

As noted above, light from a detector corresponding to one track such as track 55 can reach detectors 45 and 57 in the adjacent tracks and generate a cross-talk signal that can interfere with the operation of the encoder. In addition, the space needed to mount and align the emitter-detector modules is at a premium in miniature encoders.

The present invention avoids these problems by utilizing an absolute encoder design having a single track in which the bands discussed above are replaced by colored spots. Each spot emits a color signal that is unique to that spot when illuminated as discussed below. The color signal is received by a color sensor that generates a set of signals that measure the spectrum emitted by the spot. The spectrum can be converted to a unique number representing the position of the carrier relative to the detector.

Figure 7:
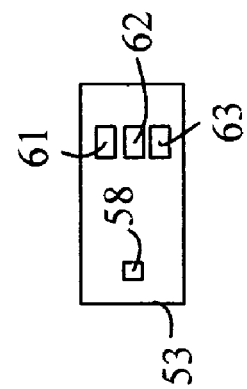
FIG. 7 is an enlarged top view of detector 53 shown in FIG. 5.
Figure 6:
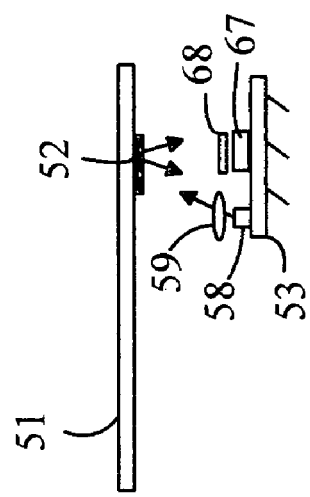
FIG. 6 is a cross-sectional view of encoder 50 through line 6-6 shown in FIG. 5.
Figure 5:
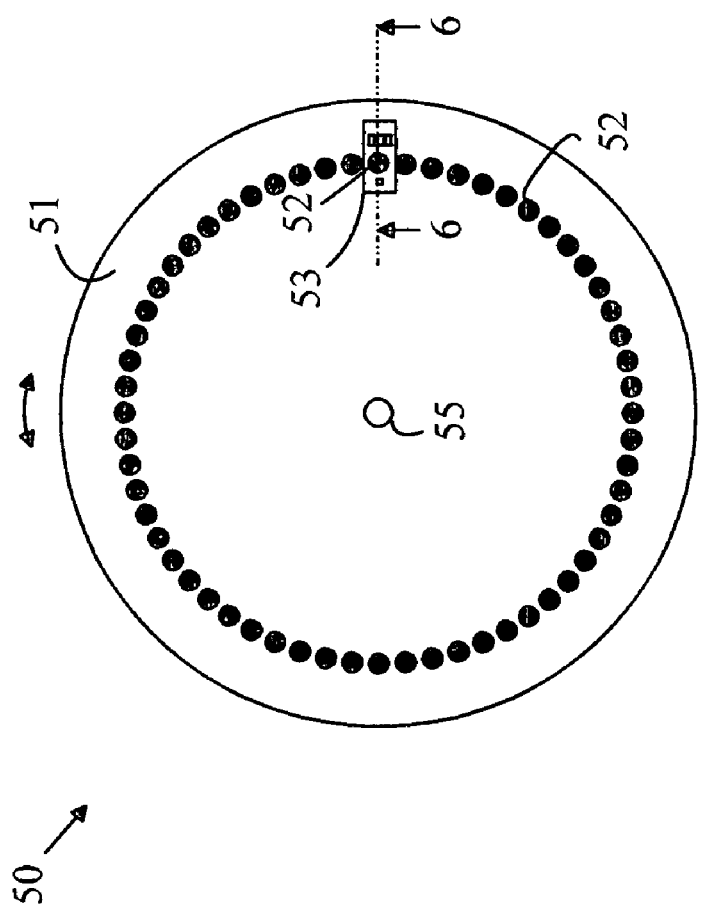
FIG. 5 is a top view of an encoder according to one embodiment of the present invention.

Refer now to FIGS. 5-7, which illustrate a shaft encoder 50 according to one embodiment of the present invention. FIG. 5 is a top view of encoder 50, and FIG. 6 is a cross-sectional view of encoder 50 through line 6-6 shown in FIG. 5. FIG. 7 is an enlarged top view of emitter-detector module 53 shown in FIG. 5. Encoder 50 includes a code disk 51 that rotates with a shaft 55. Code disk 51 has a plurality of spots 52 in a circular track having a center coincident with that of shaft 55. As code disk 51 rotates, the spots pass over an emitter-detector module 53 that includes a light source and a color detector. In this embodiment, the light source 58 includes an LED and a lens 59 for imaging the light from the LED onto the surface of code disk 51 at the radius at which the spots are located. However other light sources such as VCSELs, edge-emitting laser diodes, etc can be utilized. The imaged spot has a diameter chosen such that only one spot is illuminated at any given time.

The illuminated spots emit a light signal having a color that is characteristic of the particular spot that is illuminated. The light leaving the spot that is in a predetermined position above emitter-detector module 53 such that that spot illuminated is detected by a color sensor that includes light sensors shown at 61-63. Each light sensor includes a photodiode and a bandpass filter that limits the response of that photodiode to light in a predetermined wavelength band. The photodiode and the bandpass filter corresponding to light sensor 62 are shown at 67 and 68, respectively in FIG. 6. To simplify the following discussion, it will be assumed that the three light sensors measure light in the red, blue, and green regions of the spectrum to generate a signal that can be denoted by a vector (R,B,G), where R, B, and G are the amplitudes of the signals generated by light sensors for the red, blue, and green spectral regions, respectively. The amplitude of the signal generated by each photodiode represents the intensity of light in the region of the spectrum corresponding to that photodiode.

In one embodiment of the present invention, each of the spots comprises a mixture of three phosphors, each phosphor emitting light in a region of the spectrum corresponding to one of the light sensors. For example, the phosphors can emit light in the red, blue, and green regions of the spectrum. Exemplary red phosphors include ZnSe, CaS, SrS, $Y_2O_2S$, and $Mg_4GeO_5F$. Exemplary green phosphors include $BaGa_4S_7$, $SrGa_2S_4$, ZnS), and exemplary blue phosphors include $BaMg_2Al_{16}O_{27}$. However, other phosphors can be utilized as discussed in more detail below. The wavelength of light generated by light source 58 is chosen such that all of these phosphors will be excited. The amount of light generated in each spectral region is related to the amount of phosphor in the spot being illuminated. Hence, the (R,B,G) value for each spot will be unique if the combination of phosphor concentrations in each spot is unique. Consider the case in which each phosphor can be applied in 16 different amounts, then the (R,B,G) values can uniquely define over 4000 positions.

In general, in embodiments that utilize a code disk, a plurality of phosphors are arranged in a pattern such that the composition of phosphors is a unique function of the angle, θ, from a reference point of the code disk. By measuring the light generated in each of the spectral bands when a small spot on the code disk is illuminated, the value of θ associated with that spot can be ascertained. In the case of a linear encoder having a code strip, the phosphor pattern is chosen such that the composition of phosphors is a unique function of the distance from a reference point on the code strip.

Refer now to FIGS. 8 and 9, which illustrate a linear encoder according to another embodiment of the present invention. FIG. 8 is a top view of encoder 70, and FIG. 9 is a cross-sectional view of encoder 70 through line 9-9 shown in FIG. 8. Encoder 70 includes a code pattern carrier 71 having a code strip 74 that moves relative to an emitter-detector module 73 in the direction shown at 75. Emitter-detector module 73 includes a light source 78 that is imaged onto code strip 74 via a lens 79. The light generated by code strip 74 is detected by detector 77 in emitter-detector module 73. Detector 77 is similar to the detectors discussed above in that it includes a plurality of photodetectors that detect light in different spectral bands. To simplify the drawing, the individual photodiodes and bandpass filters have been omitted.

Code strip 74 includes a plurality of phosphors arranged in a pattern such that the composition of phosphors is a unique function of the distance X from one end of the code strip. By measuring the light generated in each of the spectral bands when a small spot on code strip 74 is illuminated, the value of X associated with that spot can be ascertained. The conversion of the measured intensity values in each of the spectral bands to a position measurement can be provided by a controller 72 that has been appropriately calibrated. The position value can be in the form of a binary number of the type normally provided by conventional absolute encoders to enable an encoder according to the present invention to be substituted for such conventional encoders.

Code strip 74 can be a series of distinct spots as discussed above or a continuous strip in which each phosphor is present in an amount that varies in a continuous manner as a function of X. If discrete spots are utilized, the position is unknown between updates as the code strip moves from one spot to another. In principle, some form of interpolation can be used to provide a position readout between spots; however, such interpolation systems increase the cost of the encoder. In contrast, if a continuous strip is utilized the position of the code strip relative to the emitter-detector module is always defined.

The above described embodiments of the present invention have been directed to encoders that are analogous to a reflective encoder in that the light source that excites the phosphors and the detector that detects light in each of the spectral bands are on the same side of the code pattern carrier. However, embodiments in which the excitation source and detector are on different sides of the carrier can also be constructed. Refer now to FIG. 10, which is a cross-sectional view of another embodiment of an encoder according to the present invention. Encoder 80 includes a carrier 81 that has a code pattern 84. The code pattern provides a color signal that is unique to each point on the pattern in a manner analogous to that described above. A light source 82 illuminates a small spot on code pattern 84 such that the phosphors at that point are excited. The excitation light leaving the illuminated point is detected by a detector 87 that generates a plurality of signals indicative of the light intensity in each of a plurality of spectral bands. The phosphors can be deposited on either side of the carrier. In the embodiment shown in FIG. 10, the phosphors are on the side of the carrier that is adjacent to detector 87. In this case, carrier 81 must be transparent to light generated by light source 82.

If the phosphor is placed on top of the carrier, the carrier must be transparent to the light emitted by the phosphor; however, a carrier material that absorbs any remaining excitation light can be utilized. It should be noted that such an absorbing carrier could also be used in the embodiment discussed above with respect to FIGS. 5-8 to contain the UV light that is not absorbed by the phosphors.

The above-described embodiments of the present invention depend on providing a set of phosphors that can be excited by a common light source in which each phosphor emits a luminescent spectrum that can be separated from that emitted by the other phosphors in the set. There are numerous candidates for such phosphors known in the arts, and hence, such phosphors will not be discussed in detail here. A number of exemplary phosphors have been mentioned above; however, any of the phosphors whose emissions are sufficiently distinct to allow the concentrations of the individual phosphors to be ascertained from the measurement of the light emitted by the code carrier can be utilized. It is sufficient to note that phosphors for converting blue or UV light into other colors are used to construct "white LEDs" and other light sources.

One class of phosphors that is particularly useful in this regard is often referred to as a "quantum dot" phosphor. "Quantum dot" phosphors are phosphors whose emission spectra depends on the size of the particles, and hence, can be used to convert light to a predetermined wavelength by utilizing the appropriate sized particles. Quantum dots are semiconductor nanometer sized crystals. As the size of the particles decrease, the particles reach a size at which the band gap of the material becomes dependent on the particle size. As a result, the emission spectrum is shifted to smaller wavelengths as the particle size is decreased. For example, CdSe quantum dots emit light at various wavelengths in the visible region of the spectrum. The emission wavelength depends only on the particle size, and hence, a phosphor having the desired emission wavelength can be constructed by controlling the particle size.

The emission spectrum of any given quantum dot phosphor is very narrow. Hence, separating the emission spectrum generated by each of a plurality of phosphors in a code pattern is relatively easy compared to separating the contributions from conventional phosphors that generate broad spectrums.

Furthermore, the number of phosphors that can be incorporated in the code pattern is much greater with quantum dot phosphors. There is a tradeoff between the number of phosphors that must be utilized to provide the desired spatial resolution and the accuracy with which the concentration of the phosphor can be determined by observing the light detected by the corresponding photodetector. Consider an encoder in which three phosphors are used to construct the code pattern. If the encoder is to have 1000 detectable positions, then the detector must be capable of detecting 10 different concentrations of each phosphor to provide the 1000 unique color combinations. If, however, 10 phosphors and 10 detectors are used, the same 1000 unique combinations can be provided using only two concentrations for each phosphor.

The above-described embodiments of the present invention require that a code pattern be deposited on the carrier used in the encoder. There are a number of methods for generating the code pattern. For example, the carrier can be printed using a device similar to that used in inkjet printers. Such printers generate color spots from separate inks in which the spots are of the order of $1/1000^{th}$ of an inch or less and in which the amount of each "ink" that is deposited can be varied by factor of 100.

Figure 11:
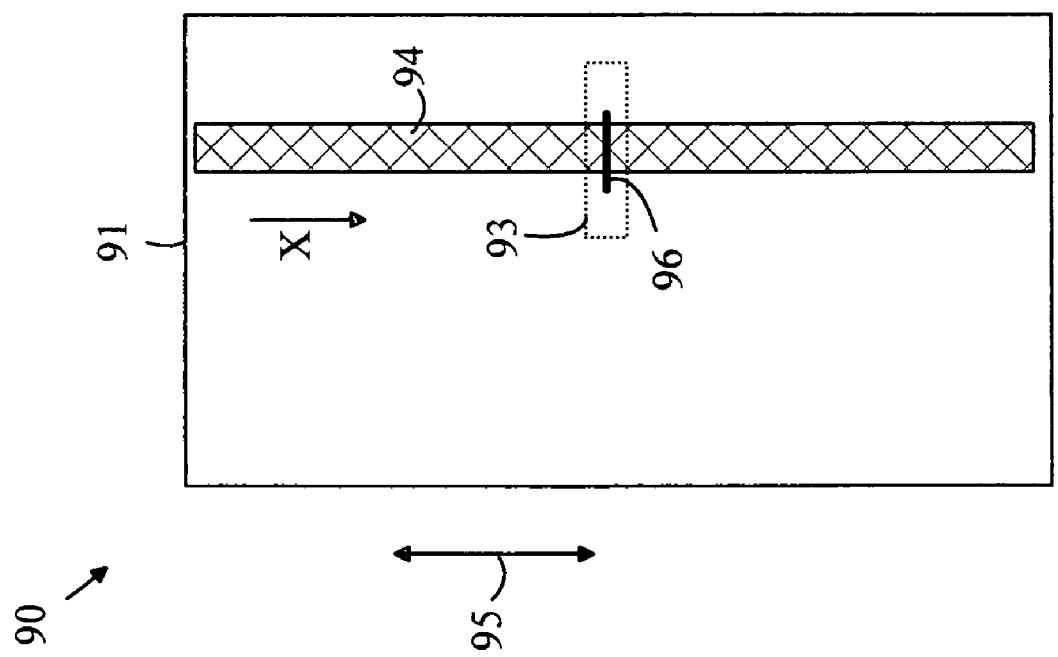
FIG. 11 is a top view of a linear encoder according to another embodiment of the present invention.

It should be noted that the phosphors do need to be homogeneously mixed at each X position of the code pattern. Hence, a continuous code pattern can be generated by successively printing phosphor layers having the desired concentration gradients along the X direction. The concentration gradient can be varied by varying the thickness of each layer or by varying the width of each layer as a function of X. Refer now to FIG. 11, which is a top view of an encoder 90 according to another embodiment of the present invention. Encoder 90 is a linear encoder having a carrier 91 with a code strip 94 that moves in the direction shown at 95 with respect to an emitter-detector module 93. In code strip 94 the phosphors vary in concentration as a function of X. The code strip is illuminated as the code strip passes over an emitter-detector module 93 in which the light source generates an elongated illumination pattern 96. The illumination pattern can be generated by using a point light source and a cylindrical lens. The detector measures an average of the light leaving the illuminated area in each of the spectral bands. The resolution of the encoder is determined by the width of the illumination pattern in the X direction. Hence, any non-uniformities in the deposition pattern in a direction perpendicular to X are of little consequence.

The above-described embodiments of the present invention utilize detectors that measure the spectrum of the light emitted by the code pattern. These detectors do not require an imaging lens that images a region of the illuminated track onto the detector, since the effective spot size on the track is determined by the light source. However, embodiments in which the detectors include a lens for imaging a portion of the surface of the carrier onto the photodetectors could be constructed. Such embodiments would collect more of the light generated by the illuminated phosphors, and hence, require less phosphor or less illumination light to provide a satisfactory signal-to-noise ratio.

Various modifications to the present invention will become apparent to those skilled in the art from the foregoing description and accompanying drawings. Accordingly, the present invention is to be limited solely by the scope of the following claims.

What is claimed is:

1. An encoder comprising
   a code carrier comprising a track that emits light at each of a plurality of track points on said track when illuminated with light having a predetermined spectrum, each of said track points emitting light having a spectrum that is different from said spectrum emitted by others of said track points;
   a light source that illuminates a portion of said track with light of said predetermined illumination spectrum;
   a detector that provides a plurality of signals indicative of said spectrum of light leaving said portion of said track when said portion includes one of said track points, wherein said code carrier moves with respect to said detector.

2. The encoder of claim 1 wherein each track point comprises a mixture of phosphors, said mixture having a different composition for each of said track points.

3. The encoder of claim 2 wherein said predetermined illumination spectrum excites each of said phosphors.

4. The encoder of claim 2, wherein each said track point comprises a mixture of at least three phosphors of different colors to form a unique color for each said track point.

5. The encoder of claim 1 wherein at least one of said track points comprises a quantum dot phosphor.

6. The encoder of claim 1 wherein said detector comprises a plurality of photodetectors, each photodetector generating a signal indicative of an intensity of light in a spectral band associated with that photodetector, said spectral bands being different for each of said photodetectors.

7. The encoder of claim 6, further comprising a bandpass filter associated with each of said plurality of photodetectors to limit a response of each of said plurality of photodetectors to a desired spectral band.

8. The encoder of claim 1 wherein said track comprises a mixture of phosphors, said mixture varying in composition in a continuous manner as a function of a distance measured along said track.

9. The encoder of claim 1 wherein said track comprises a phosphor having a pattern that has a dimension perpendicular to said track point on said track and which varies continuously in that dimension as a function of a distance measured along said track.

10. The encoder of claim 1 wherein said carrier has first and second surfaces and wherein said light source and said detector are located adjacent to said first surface.

11. The encoder of claim 10 where said track is on said first surface.

12. The encoder of claim 1 wherein said carrier has first and second surfaces and wherein said light source is adjacent to said first surface and said detector is adjacent to said second surface.

13. The encoder of claim 1 wherein said encoder comprises an absolute position encoder.

14. The encoder of claim 1, said encoder comprising a shaft encoder, wherein said carrier comprises a code disk affixed to a rotatable shaft.

15. The encoder of claim 1, said encoder comprising a linear encoder, wherein said carrier comprises a code strip affixed to a linearly moveable carriage.

16. The encoder of claim 1, further comprising a controller connected to said plurality of signals from said detector, said controller being calibrated to convert an output of said detector into a position measurement for said code carrier.

* * * * *